United States Patent [19]
Leroux

[11] Patent Number: 5,321,418
[45] Date of Patent: Jun. 14, 1994

[54] METHOD FOR DISPLAYING IMAGES COMPRISING Q LEVELS OF GREY ON A MATRIX SCREEN

[75] Inventor: Thierry Leroux, Fontaine, France

[73] Assignee: Commissariat a l'Energie Atomique, Paris, France

[21] Appl. No.: 817,368

[22] Filed: Jan. 6, 1992

[30] Foreign Application Priority Data

Jan. 11, 1991 [FR] France ............................... 91 00288

[51] Int. Cl.$^5$ ............................................. G09G 3/00
[52] U.S. Cl. ....................................... 345/89; 345/147
[58] Field of Search ............... 340/701, 703, 793, 784, 340/767; 359/54, 56, 59; 345/87, 88, 89, 63, 77

[56] References Cited

U.S. PATENT DOCUMENTS

| | | | |
|---|---|---|---|
| 5,122,783 | 6/1992 | Bassetti, Jr. | 345/147 |
| 5,157,524 | 10/1992 | Dijon et al. | 345/89 |
| 5,252,959 | 10/1993 | Kono | 345/147 |

FOREIGN PATENT DOCUMENTS

| | | |
|---|---|---|
| 0032362 | 7/1981 | European Pat. Off. |
| 0092181 | 10/1983 | European Pat. Off. |
| 0219479 | 4/1987 | European Pat. Off. |
| 0364307 | 4/1990 | European Pat. Off. |
| 0384403 | 8/1990 | European Pat. Off. |
| 8812810 | 4/1990 | France |

OTHER PUBLICATIONS

1985 International Display Research Conference, S. T. Lagerwall et al., pp. 213-221, "Ferroelectric Liquid Crystals for Displays".

Primary Examiner—Alvin E. Oberley
Assistant Examiner—Chanh Nguyen
Attorney, Agent, or Firm—Oblon, Spivak, McClelland, Maier & Neustadt

[57] ABSTRACT

A method for displaying, on a matrix screen composed of pixels disposed along K lines and M columns, images having Q grey levels $G_j$, $0 \leq j \leq Q-1$. Pixels are scanned and to display a given grey level, a mixed number of black and white states of the pixels are displayed. The number of white states and the number of black states required to display a given grey level are calculated based on a number of sub-frames N used to display the grey scale image and the number of different grey scales Q. This assigns a black state or a white state to each of the addressing phase indices. The addressing phase indices are then selected according to predetermined rules and the states of the pixels in each sub-frame vary within a sub-frame displaying a given grey scale by keeping the number of black and white pixels of the sub-frame as constant as possible.

3 Claims, 1 Drawing Sheet

METHOD FOR DISPLAYING IMAGES COMPRISING Q LEVELS OF GREY ON A MATRIX SCREEN

FIELD OF THE INVENTION

The present invention generally concerns the display methods of matrix screens composed, as indicated, of a certain number of pixels situated at the crossing points of K line conductors and M column conductors.

BACKGROUND OF THE INVENTION

The present invention is applicable to any type of known matrix screen which functions via transmission or emission and more particularly to passive multiplexed liquid crystal screens making it possible to display on each pixel one of two states to be denoted for the sake of convenience by one black state and one white state.

It is also known that the addressing of matrix screens comprising K lines and M columns is effected via the successive scanning of different lines. For a time equal to the line time Tl, one line l is "open" by applying a voltage VL. During this period, the M image data signals are addressed onto the M columns in the form of voltages, for example in the case of liquid crystals ±VC. The pixel situated at the intersection of the line l and the column m is thus excited by a potential difference VL±VC which, depending on its location with respect to the switching threshold of the liquid crystal of the screen, renders it transparent (white state) or opaque (black state).

Such screens are well known and are described in detail in the documents EP-A-0 092 181 and EP-A-0 032 362.

More specifically, the present invention concerns the problem of writing on such screens a certain number Q of shades or levels of grey Gj on a black and white or colored image.

The obtaining of a shade of grey Gj on a specific pixel may up until now only result in the display on this pixel of a sequence comprising a certain number of white and black states, the perception of the resultant grey being clearly proportional to the ratio of the number of these states of one category and of the other; this perception may result in either an interpolation due to the functioning of the device itself (in the case of liquid crystals) or in the visual phenomenon which makes use of the persistance of retinal impressions. The levels of grey Gj thus defined are generally speaking "equidistant", that is, it is possible to move from one to the other discontinuously by adding or subtracting a black state or white state in the display sequences. So as to inscribe levels of greys, it is necessary to superimpose several black and white states on each pixel, which involves scanning the screen several times during successive sub-frames and relating to a given image. As for the frames, this scanning takes place line by line. The state of the art is this respect is clearly demonstrated by the document entitled "Conference Records of the 1985 International Display Research Conference, San Diego, Calif., 15–17 Oct. 1985, pages 213 to 220", as well as by the documents EP-A-0 219 479 and FR-A-88 12 810 of 30 Sep. 1988.

All the methods of the prior art briefly mentioned above making it possible to display such shades of greys do nevertheless have to various degrees a certain number of drawbacks not fully resolved to date and which may be denoted under the term of "coupling" signifying in fact that the displaying of a specific pixel of such a screen is not completely independent of the displaying of adjacent pixels. These drawbacks are well-known to experts in this field and are described in detail in the document relating to "Proceedings of the SID Conference" held at Las Vegas in May 1990, pages 412 to 415.

First of all, a coupling exists between the various pixels of a given column for the following reason: when a specific pixel of this column is excited, the data signal applied in the form of voltage steps ±VC to the column in question arrives at the same time at all the other pixels of this column which do not correspond to lines selected at this moment. In other words, this results in obtaining stray signals which disturb the instantaneous state of these other pixels. More precisely, the coupling between the pixels of a given column mainly depends on the number of black to white transitions present in the column in question. In other words, this drawback is that much more marked when the number of passages from black to white in the pixels of a given column is high.

This defect is a defect inherent in the addressing principle of the screen itself. Coupling depends on the image displayed, which is totally random as regards the successions of white and black pixels. In fact, in all the grey display methods of the prior art mentioned earlier, the scanning method randomly brings about successions of white and blacks to the various pixels according to the various image addressing phases. Accordingly, this results in a temporal correlation or interaction between the method for scanning the screen and the image needed to be displayed on it, which thus may randomly accentuate the actual defects of the screen without offering any possible recourse.

SUMMARY OF THE INVENTION

One of the aims of the present invention is to specifically introduce a routing of the addressing phases within the scanning method so as to render as low as possible the preceding correlation by rendering the number of voltage or transition fronts on each column as independent as possible of the image during display.

The object of the present invention is to also correct another defect linked to the notion of coupling between the various pixels mentioned earlier. On this occasion, this no longer involves columns but lines and defects resulting from the following phenomenon. The potential difference, applied to each pixel on the line conductors and column conductors so as to display there either a white state or a black state, results in developing on the surfaces of the conductors present, constituting in fact local capacities at the level of each pixel, electric charges of a given sign for the black pixels and of an opposing sign for the white pixels. If accordingly, when passing from one line to the next one, the difference of the number of blacks and whites displayed is high, there exists on all the line conductors of the screen a significant change of charges resulting in an outflow of the latter in the form of an eddy current which disturbs line control electronics. Thus, in order to obtain image quality, it is advantageous during display to keep the number of black and white pixels as constant as possible. The invention virtually embodies this situation by retaining the difference of the number of white pixels and black pixels as being constant from one line to another.

The object of the present invention is to provide a method for displaying, on a matrix screen composed of pixels disposed along K lines and M columns, images able to comprise Q levels of greys (Go ... Gj ... GQ−1) obtained by inscribing on each pixel, during a process for inscribing image data line by line during N sub-frames (0, ..., t, ... N−1) of each frame, a succession of black and white states selected from N addressing phases (Ao ... Ai ... AN−1), each of which defines for displaying a given grey Gj one black or white state, the process flow of all the phases ensuring inscription of the number of black and white states required to finally obtain one frame of the desired level of grey Gj on each pixel, wherein:

I) the scanning of the screen is effected by dividing each line into S sub-lines (1, ... q, ... S) each selected during a sub-time with a line period equal to Tl/S, Tl being the addressing time of one line, S successive information then being addressed on each column during the time Tl;

II) the choice of a black or white display on each pixel during the addressing phase Ai so as to obtain the grey Gj obeys the following rules:
1) if N=Q−1 and if
  a) i<j a white state is displayed
  b) i≧j, a black state is displayed
2) if N=Q+1,
  a) if i≦j, a white state is displayed
  b) otherwise, a black state is displayed
3) if N>Q+1, an integer U is defined such that 0≦U≦−Q−1, and
  a) if i≦j+U, a white state is displayed
  b) otherwise, a black state is displayed.

III) the index of the phase Ai on the pixel (l, c) of the line l and of the column C during the sub-frame of order t and the sub-line of order q being noted i (l,c,q,t) obeys the following rules:

1)a) if S<N
  i(1,1,1,t)=ST (t modulo N)
with ST (x) an element of any arrangement of N positive whole numbers, zero included, (0≦x≦N−1), 1)b) if S=N
  i(1,1,1,t)=ST (t modulo N) or i(1,1,1,t)=α constant whole number so that 0≦α≦N−1
2) i(l,c,q+1,t)=[i(l,c,q,t)+S] modulo N with 1≦l≦K;
3) (l+1,c,q,t)=[i(l,c,q,t)+S] modulo N with 1≦l≦K;
4) i(l,c,q,t)=[i(l,1,q,t)+SC (c Modulo N)] modulo N with 1≦c≦M and SC(y) an element of any arrangement of N positive whole numbers, zero included (O≦y≦N−1).

On the basis of the preceding definition of the method, it is possible to make the following comments.

First of all, the general case of scanning the screen by means of lines divided into S sub-lines includes the case where S=1, that is where there are no sub-lines and where each line is only open solely once during each sub-frame. This is the case most frequently used up until now in the prior art.

The choice of the displaying of a black state B or white state W on each pixel during each opening of a line or sub-line during a sub-frame results, as in the prior art, of the reading of a twin-input matrix table whose lines J represent the levels of greys Gj to be displayed and the columns i various addressing phases Ai during each sub-frame of the scanning.

Table I relates to the case where N=Q−1 with Q=8 and N=7. It is characterized by the presence of a level Go solely composed of black states and a level G7 solely composed of white states, that is two levels without any black/white transition. The reading of this table shows, for example, that if it is desired to display on a given pixel a grey G3, a white state (W) shall be displayed during each of the phases A0, A1, A2 and a black state (B) during each of the phases A3, A4, A5 and A6.

Table II relates to the case where N=Q+1 with Q=8 and N=9. It is characterized by the fact that there is a black/white transition for each shade of grey, that is in fact when a display sequence comprises all the N addressing phases. The significance of this observation shall be explained subsequently.

Table IIb relates to the case where N>Q+1 with Q=8 and 0≦U≦N−9 is characterized also by the fact that there is only one black/white transition for each shade of grey.

Independently of any possible sub-line scanning and the implementation of table II or table IIb, the main characteristic of the invention resides in the order of sequencing of N addressing phases on each pixel during N successive sub-frames which is entirely original and fully corrects those defects appearing on screens of the prior art for which sequencing does not form part of any particular intended organization.

This organization of the order of sequencing N addressing phases results in mathematical formulations given under paragraph III, sub-paragraphs 1, 2, 3 and 4 concerning the preceding general definition of the method of the invention. There now follows an explanation of the substance and its reason for existence.

III.1: The formula ST(x) denotes the element with an order x of an arrangement (in the sense of combinatory analysis) selected arbitrarily from N positive whole numbers, zero included. If, for example, N=7 and if ST=5361024, there shall then be:

| |
|---|
| ST (0) = 5 |
| ST (1) = 3 |
| ST (2) = 6 |
| ... |
| ST (6) = 4 |

The formula i(1,1,1,t)=ST(t modulo N) means that the preceding sequence ST(0), ST(1), ST(2) ... ST(N−1) denotes the order or index of phases applied to the first pixel of the first, line, the first column and the first sub-line of the screen during successive sub-frames. It also means that this sequence is repeated cyclically with a period N, except when S=N and i(1,1,1,t)=α where this sequence is constant.

III.2: This formula indicates that the order number of the phase applied to a specific pixel during a sub-frame is increased by one unit when a movement is effected from one sub-frame to the next one. The modulo factor N ensures the cyclic nature of the sequence of phases when the Nth has been reached.

III.3: This formula indicates that the order number of the phase applied to a specific pixel during a given sub-frame is increased by S units when a movement is made from one line to the next one.

III.4: As SC(y) is an element with an order y of any arrangement of N positive whole numbers, zero included, possibly similar to the arrangement ST (0,1,2 .. . N−1), this formula means that, for a pixel belonging to a line l, to a sub-line q and during a given sub-frame t, the order number of the phase applied is that of the pixel corresponding to column 1 increased by SC(c). The two modulo factors N ensure the cyclic nature of the sequence of the indices of phases when the Nth has been reached, which occurs when the number of columns exceeds N or when the order number i thus calculated exceeds N.

In all the examples for the routing of phases to be given subsequently, so as to more suitably quickly providing calculations, arrangements Sc shall be selected composed of elements following according to the natural order of figures. However, it ought to be understood that this concerns examples given by way of non-restrictive examples and that, generally speaking, the SC series may be in any order. However, in practice, experience shows that it is advantageous to preferably select the following rules:

for a monochrome screen $SC(y+1)=SC(y)+1$, for example $SC=0123456$;

for a three-colored screen
$SC(y+1)=SC(y)+3$ modulo N, for example $0362514$ for $N=7$.

Finally, it may be observed that owing to the relation $i(1,1,1,t)=ST$ (t modulo N), the scanning method is periodic with a sub-frame period N. when $S=N$ and $i(1,1,1,t)=\alpha$, the method has a sub-frame period 1. When sub-lines are used in addition, the relation $i(l,c,q+1,t)=i(l,c,q,t)+1]$ modulo N shows that the scanning period remains periodic with a sub-frame period N. However, in this case, each pixel is addressed NxS during this period and the "average" period of the phenomenon is then equal to N/S sub-frames.

Advantageously, if $[(K.S) \text{modulo } N] \neq 0$, $ST(x+1)=[ST(x)+\beta]$ modulo N where $\beta$ is a whole number equal to (K.S).modulo N.

The following examples show the succession of addressing phases referring to screens having an extremely small number of lines and columns with respect to current screens. These examples would essentially have an illustrative role intended to fully explain the routing of the various addressing phases of pixels in the method of the invention.

Table III relates to a screen having four lines and four columns ($K=M=4$). It is addressed according to $Q=8$ levels of grey, white and black and $N=7$ addressing phases.

It corresponds to the case $N=Q-1$ and functions according to table I given previously. For table III, the frame series $ST=0415263$ and the column series $SC=0123456$ have been selected. In this case, $ST(x+1)=[ST(x)+4]$ modulo N as $\beta=4$ in this instance.

The screen is addressed in a line by line method ($S=1$). Table III shows, for each pixel, the indices of the addressing phases during frames $t=0$ to $t=6$.

Table IV relates to an example in which $N=Q-1$ with $N=7$, $Q=8$ and $S=2$. In this example, the frame series $ST=0123456$ and the column series $SC=0123456$ have been selected.

Table IV also relates to a screen having four lines and four columns. The correspondance with the order of the addressing phases and the white and black to be displayed according to a specific grey may accordingly result from the preceding table I.

In the example used from table IV, each line is scanned twice during each sub-frame, each pixel being accordingly addressed twice during each sub-frame.

Table V also relates to the displaying of a screen with four lines and four columns, but this time in the case where $N=Q+1$, that is with reference to the preceding table I. The data selected for this example is $N=9$, $Q=8$, $S=2$. Thus, there are nine sub-frames numbered from 0 to 8 and, for the sake of simplicity, only the sub-frames 0, 1, 2 and 8 have been shown.

In this example, the frame series $ST=234567801$ and the column series $SC=012345678$ have been shown.

Table VI shows one example in which the screen has twelve columns and six lines ($M=12$ and $K=6$). It corresponds to the case where $N=Q+2$ with $N=10$, $Q=8$ and $S=2$.

In this example, the frame series $ST$ has been selected as being equal to $2345678901$ and the column series $SC=9012345678$.

Table VI shows the indices of the display phases on each pixel for the sub-frames 0, 1 . . . and 9. The correspondance of the phases with the black or white states for a given grey is fixed by table IIb.

The preceding tables make it possible to easily verify the advantages afforded by the method of the invention as regards coupling for displaying images of a given grey Gj.

As regards coupling between pixels of a given column, it is ensured that, so as to display a given grey Gj, the indices of the addressing phases follow each other cyclically in a natural order during a given sub-frame, which results in minimizing the number of black/white and white/black transitions.

For coupling between pixels when passing from one line (or sub-line) to the next one, it has been established that the constancy (or virtual constancy) of the difference (number of white pixels)−(number of black pixels) derives from the fact that the order numbers of the displaying phases of two consecutive lines, which reproduce with a shift of one unit the column series SC in a cyclic form (modulo N), are virtually identical once the number M of columns is high with respect to the number N of phases, this generally being the case.

A screen addressed according to the method of the invention is thus the most suitable for reacting upon the arrival of random black and white data of the image signal.

BRIEF DESCRIPTION OF THE DRAWINGS

With reference to the FIGURE, there now follows a non-restrictive example of a device for implementing the display method of the invention with a level of grey on a matrix screen.

The device described makes it possible to display Q levels of greys and uses N addressing phases.

DETAILED DESCRIPTION OF THE PREFERRED EMBODIMENTS

Figure 1:
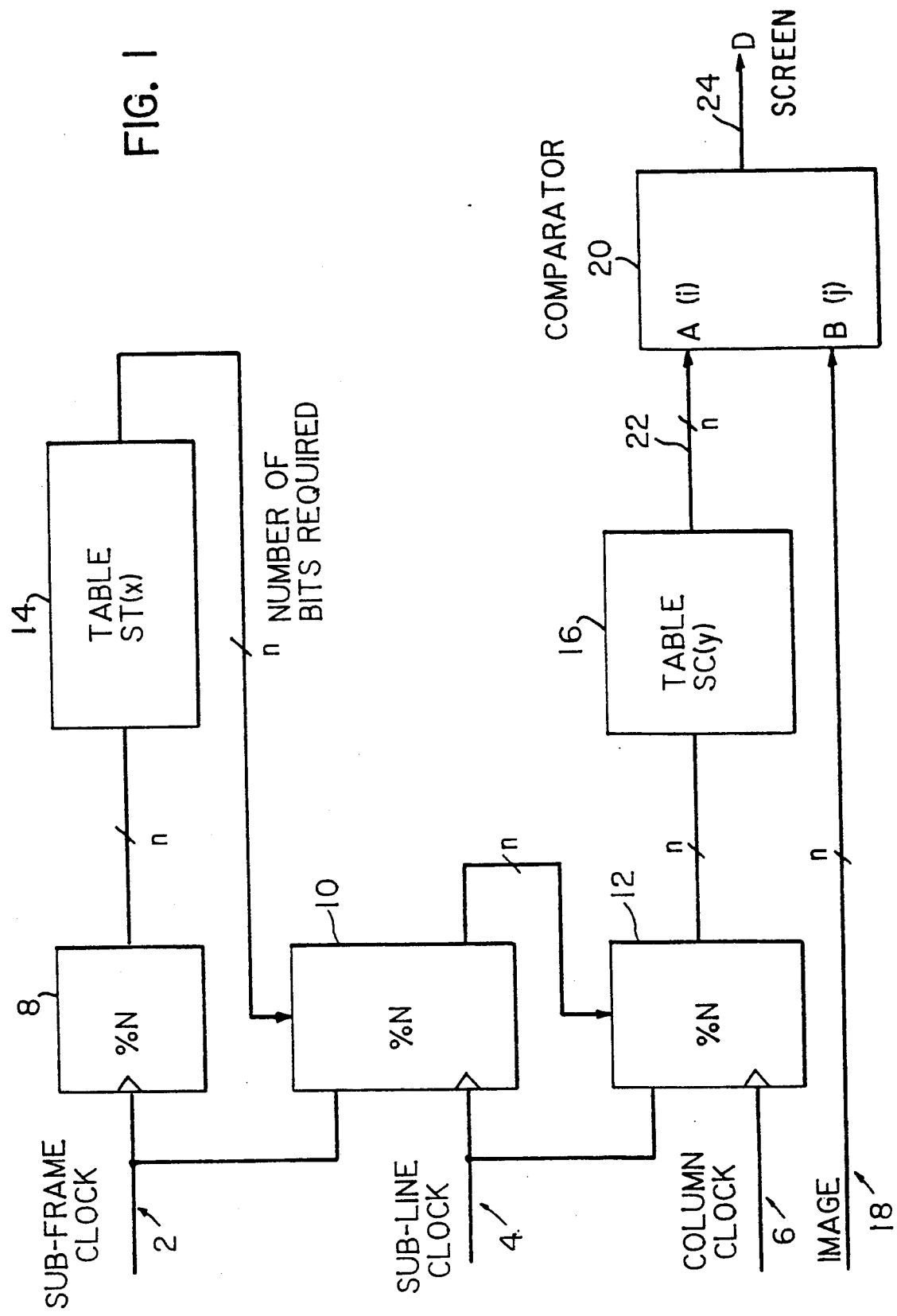

The device of FIG. 1 functions on the basis of three clocks (not shown) used to sequence the sub-frames, the sub-lines and the columns. The pips of a sub-frame clock are sent onto the line 2, the pips of a sub-line clock onto line 4 and the pips of a column clock onto line 6.

The device functions with the aid of counters modulo N (divider by N) referenced 8, 10 and 12 on the figure. The counters 8 and 12 are associated with a conversion circuit, for example a PROM type circuit, the conversion circuit 14 associated with the counter 8 being intended to deliver the arrangement ST(x) of the frame series and the conversion circuit 16 associated with the counter 12 being intended to deliver the series of columns SC(y). The various values of greys Gj corresponding to the image to be displayed are introduced onto the line 18, each of the grey levels being coded by a series of n bits (2n−1<N≦2n), as well as all the output information of the conversion circuits or of the counters.

The counter 8 counts the sub-frame clock fronts reached on line 2. The counter 10 counts the sub-line clock fronts and is precharged at each sub-frame clock pip by the value derived from the circuit 14.

The counter 12 counts the column clock fronts when they arrive at line 6 and is precharged at each sub-line clock front arriving on line 4 by the value of the preceding counter 10.

On its input 22, a comparator 20 receives the output of the conversion circuit 16 which represents the value i corresponding to the index of the current addressing phase. This comparator 20 compares this value i with the value j derived from the line 18 representing the grey to be displayed and, depending on the value of i with respect to that of j, provides at the output 24 a black or white data signal D which is applied to the pixel currently being written and defined both by the order of the sub-frame, the order of the sub-line and that of the column.

In the particular case where $ST(x+1)=[ST(x)+\beta]$ modulo N, the counter 8 and the conversion circuit 14 may be suppressed, as well as the sub-frame clock. In fact, having regard in this case to the relations between K, S and N, the preceding relation is obtained directly with the counter 10.

TABLE I

| j | i=0 | 1 | 2 | 3 | 4 | 5 | 6 | |
|---|---|---|---|---|---|---|---|---|
| 0 | B | B | B | B | B | B | B | no black/white transition |
| 1 | W | B | B | B | B | B | B | one black/white transition |
| 2 | W | W | B | B | B | B | B | " |
| 3 | W | W | W | B | B | B | B | " |
| 4 | W | W | W | W | B | B | B | " |
| 5 | W | W | W | W | W | B | B | " |
| 6 | W | W | W | W | W | W | B | " |
| 7 | W | W | W | W | W | W | W | " |

TABLE II

| j | i=0 | 1 | 2 | 3 | 4 | 5 | 6 | 7 | 8 | |
|---|---|---|---|---|---|---|---|---|---|---|
| 0 | W | B | B | B | B | B | B | B | B | one black/white transition |
| 1 | W | W | B | B | B | B | B | B | B | one black/white transition |
| 2 | W | W | W | B | B | B | B | B | B | one black/white transition |
| 3 | W | W | W | W | B | B | B | B | B | one black/white transition |
| 4 | W | W | W | W | W | B | B | B | B | one black/white transition |
| 5 | W | W | W | W | W | W | B | B | B | one black/white transition |
| 6 | W | W | W | W | W | W | W | B | B | one black/white transition |
| 7 | W | W | W | W | W | W | W | W | B | one black/white transition |

TABLE III

| | t = 0 | t = 1 | t = 2 | t = 3 | t = 4 | t = 5 | t = 6 |
|---|---|---|---|---|---|---|---|
| l = 1 | 0 1 2 3 | 4 5 6 0 | 1 2 3 4 | 5 6 0 1 | 2 3 4 5 | 6 0 1 2 | 3 4 5 6 |
| l = 2 | 1 2 3 4 | 5 6 0 1 | 2 3 4 5 | 6 0 1 2 | 3 4 5 6 | 0 1 2 3 | 4 5 6 0 |
| l = 3 | 2 3 4 5 | 6 0 1 2 | 3 4 5 6 | 0 1 2 3 | 4 5 6 0 | 1 2 3 4 | 5 6 0 1 |
| l = 4 | 3 4 5 6 | 0 1 2 3 | 4 5 6 0 | 1 2 3 4 | 5 6 0 1 | 2 3 4 5 | 6 0 1 2 |

TABLE IV

| | t = 0 | t = 1 | t = 2 | t = 3 | t = 4 | t = 5 | t = 6 |
|---|---|---|---|---|---|---|---|
| l = 1 | 0 1 2 3<br>1 2 3 4 | 1 2 3 4<br>2 3 4 5 | 2 3 4 5<br>3 4 5 6 | 3 4 5 6<br>4 5 6 0 | 4 5 6 0<br>5 6 0 1 | 5 6 0 1<br>6 0 1 2 | 6 0 1 2<br>0 1 2 3 |
| l = 2 | 2 3 4 5<br>3 4 5 6 | 3 4 5 6<br>4 5 6 9 | 4 5 6 0<br>5 6 0 1 | 5 6 0 1<br>6 0 1 2 | 6 0 1 2<br>0 1 2 3 | 0 1 2 3<br>1 2 3 4 | 1 2 3 4<br>2 3 4 5 |
| l = 3 | 4 5 6 0<br>5 6 0 1 | 5 6 0 1<br>6 0 1 2 | 6 0 1 2<br>0 1 2 3 | 0 1 2 3<br>1 2 3 4 | 1 2 3 4<br>2 3 4 5 | 2 3 4 5<br>3 4 5 6 | 3 4 5 6<br>4 5 6 0 |
| l = 4 | 6 0 1 2<br>0 1 2 3 | 0 1 2 3<br>1 2 3 4 | 1 2 3 4<br>2 3 4 5 | 2 3 4 5<br>3 4 5 6 | 3 4 5 6<br>4 5 6 0 | 4 5 6 0<br>5 6 0 1 | 5 6 0 1<br>6 0 1 2 |

TABLE VI

| | t = 0 | | t = 1 | | t = 9 |
|---|---|---|---|---|---|
| L. 1 | 2 3 4 5 6 7 8 9 0 1 2 3<br>3 4 5 6 7 8 9 0 1 2 3 4 | L. 1 | 3 4 5 6 7 8 9 0 1 2 3 4<br>4 5 6 7 8 9 0 1 2 3 4 5 | L. 1 | 1 2 3 4 5 6 7 8 9 0 1 2<br>2 3 4 5 6 7 8 9 0 1 2 3 |
| L. 2 | 4 5 6 7 8 9 0 1 2 3 4 5<br>5 6 7 8 9 0 1 2 3 4 5 6 | L. 2 | 5 6 7 8 9 0 1 2 3 4 5 6<br>6 7 8 9 0 1 2 3 4 5 6 7 | L. 2 | 3 4 5 6 7 8 9 0 1 2 3 4<br>4 5 6 7 8 9 0 1 2 3 4 5 |
| L. 3 | 6 7 8 9 0 1 2 3 4 5 6 7<br>7 8 9 0 1 2 3 4 5 6 7 8 | L. 3 | 7 8 9 0 1 2 3 4 5 6 7 8<br>8 9 0 1 2 3 4 5 6 7 8 9 | L. 3 | 5 6 7 8 9 0 1 2 3 4 5 6<br>6 7 8 9 0 1 2 3 4 5 6 7 |
| L. 4 | 8 9 0 1 2 3 4 5 6 7 8 9<br>9 0 1 2 3 4 5 6 7 8 9 0 | L. 4 | 9 0 1 2 3 4 5 6 7 8 9 0<br>0 1 2 3 4 5 6 7 8 9 0 1 | L. 4 | 7 8 9 0 1 2 3 4 5 6 7 8<br>8 9 0 1 2 3 4 5 6 7 8 9 |
| L. 5 | 0 1 2 3 4 5 6 7 8 9 0 1<br>1 2 3 4 5 6 7 8 9 0 1 2 | L. 5 | 1 2 3 4 5 6 7 8 9 0 1 2<br>2 3 4 5 6 7 8 9 0 1 2 3 | L. 5 | 9 0 1 2 3 4 5 6 7 8 9 0<br>0 1 2 3 4 5 6 7 8 9 0 1 |
| | 2 3 4 5 6 7 8 9 0 1 2 3 | | 3 4 5 6 7 8 9 0 1 2 3 4 | | 1 2 3 4 5 6 7 8 9 0 1 2 |

TABLE VI-continued

| | t = 0 | | t = 1 | | t = 9 |
|---|---|---|---|---|---|
| L. 6 | 345678901234 | L. 6 | 456789012345 | L. 6 | 234567890123 |

TABLE V

| | | t = 0 | t = 1 | t = 2 | ... | t = 8 |
|---|---|---|---|---|---|---|
| l = 1 | { | 2345 | 3456 | 4567 | | 1234 |
| | | 3456 | 4567 | 5678 | | 2345 |
| l = 2 | { | 4567 | 5678 | 6780 | | 3456 |
| | | 5678 | 6780 | 7801 | | 4567 |
| l = 3 | { | 6780 | 7801 | 8012 | | 5678 |
| | | 7801 | 8012 | 0123 | | 6780 |
| l = 4 | { | 8012 | 0123 | 1234 | | 7801 |
| | | 0123 | 0234 | 2345 | | 8012 |

TABLE IIb

| | | i | | | | | | | |
|---|---|---|---|---|---|---|---|---|---|
| j | 0...U | U+1 | U+2 | U+3 | U+4 | U+5 | U+6 | U+7 | ...N |
| 0 | W...W | B | B | B | B | B | B | B | ...B |
| 1 | W...W | W | B | B | B | B | B | B | ...B |
| 2 | W...W | W | W | B | B | B | B | B | ...B |
| 3 | W...W | W | W | W | B | B | B | B | ...B |
| 4 | W...W | W | W | W | W | B | B | B | ...B |
| 5 | W...W | W | W | W | W | W | B | B | ...B |
| 6 | W...W | W | W | W | W | W | W | B | ...B |
| 7 | W...W | W | W | W | W | W | W | W | ...B |

What is claimed is:

1. A method for displaying, on a matrix screen composed of pixels disposed along K lines and M columns, images having Q grey levels $G_j$, $0 \leq j \leq Q-1$, by performing the steps:

inscribing on each of said pixels, line by line during N sub-frames $SF_t$, $0 \leq t \leq N-1$, a succession of black and white states selected from N addressing phases $A_i$, $0 \leq i \leq N-1$, wherein:

I) a scanning of the screen is performed by dividing each of said lines into S sub-lines $SL_9$, $1 \leq q \leq S$, each of said sub-lines being selected during a line sub-time having a period equal to Tl/S, Tl being the addressing time of one line, successive information then being addressed on each of said columns during the time Tl;

II) a given grey state $G_j$ for each of said addressing phases $A_i$ over a series of sub-frames, being achieved by displaying either a black state or a white state on said pixels during said N sub-frames $SF_t$ using the following rules:

1) if N=Q−1 and if
   a) i<j, a white state is displayed;
   b) i≦j, a black state is displayed;
2) if N=Q+1,
   a) if i≦j, a white state is displayed;
   b) otherwise, a black state is displayed;
3) if N>Q+1, an integer U is defined such that $0 \leq U \leq N-Q-1$ and
   a) if i≦j+U, a white state is displayed;
   b) otherwise, a black state is displayed; and III) an addressing phase index, i(l, c, q, t), of the phase $A_i$ on a pixel (l,c), l being a line number and c being a column number, during sub-frame $SF_t$ and for sub-line $SL_q$, obeying the following rules:

1) if S<N, then i(l, 1, 1, t)=ST (t modulo N), with ST(x), $0 \leq x \leq N-1$, being a function having an answer set comprising N integers which are greater than or equal to zero, and correspond to a frame series which contains addressing phase indexes of a pixel at line 1, column 1, sub-line 1, for each of said sub-frames $SF_t$, $0 \leq t \leq N-1$;

2) if S=N, at least one of
   a) i(1, 1, 1, t)=ST (t modulo N); and
   b) i(1, 1, 1, t)=α with α=a constant integer such that $0 \leq \alpha \leq N-1$ 3) i(l, c, q+1, t)=[i(l, c, q, t)+1] modulo N;

4) i(l+1, c, q, t)=[i(l, c, q, t)=S] modulo N; and 5) i(l, c, q, t)=[i(l, 1, q, t)+SC(c modulo N)] modulo N, with SC(y), $0 \leq y \leq N-1$, being a function having an answer set comprising N integers which are greater than or equal to zero and correspond to a column series such that for one of said pixels belonging to a line l, column c, sub-line q and during a sub-frame t, an addressing phase index of said one pixel is an addressing phase index applied to a pixel at line l, column 1, sub-line q and sub-frame t plus SC(c).

2. A method according to claim 1, wherein: SC(y+1)=SC(y)+1 and said displaying is performed on a monochrome screen.

3. A method according to claim 1, wherein: SC(y+1)=[SC(y)+3] modulo N and said displaying is performed on a three-colored matrix screen.

* * * * *